(12) United States Patent
Park et al.

(10) Patent No.: US 7,137,131 B2
(45) Date of Patent: Nov. 14, 2006

(54) OPTICAL DISC DRIVE

(75) Inventors: Hee-Deuk Park, Seongnam-si (KR); Joong hun Yeom, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 506 days.

(21) Appl. No.: 10/724,169

(22) Filed: Dec. 1, 2003

(65) Prior Publication Data

US 2004/0111732 A1 Jun. 10, 2004

(30) Foreign Application Priority Data

Dec. 5, 2002 (KR) .................... 10-2002-0076999

(51) Int. Cl.
*G11B 33/14* (2006.01)

(52) U.S. Cl. .................................... 720/650

(58) Field of Classification Search ............... 720/650, 720/601; 360/97.01; 361/749; 369/116; 200/305

See application file for complete search history.

(56) References Cited

U.S. PATENT DOCUMENTS

| | | | |
|---|---|---|---|
| 5,499,161 A * | 3/1996 | Hosseinzadeh et al. ..... | 361/749 |
| 6,339,200 B1 * | 1/2002 | Shi et al. ..................... | 200/305 |
| 6,590,848 B1 * | 7/2003 | Chen .......................... | 720/654 |
| 6,678,112 B1 * | 1/2004 | Kaneko ................... | 360/97.01 |
| 2001/0004347 A1 * | 6/2001 | Koga et al. ................. | 369/116 |

* cited by examiner

*Primary Examiner*—Tianjie Chen
(74) *Attorney, Agent, or Firm*—Staas & Halsey LLP

(57) ABSTRACT

An optical disc drive including a case in which a circuit board is provided, a tray on which an optical disc is mounted and is installed in the case capable of sliding in and out of the case, a main base coupled to the tray wherein the main base includes, a spindle motor to rotate the optical disc, a bracket to support the spindle motor, an optical pickup to access the optical disc, and a driving motor to drive the optical pickup. The optical disc drive also includes a flexible printed circuit electrically connecting the circuit board and the tray, on which a ground pattern is formed, and a base cover coupled to the main base to protect the main base. An exposure portion of the ground pattern is formed on part of the flexible printed circuit, and a contact portion electrically contacting the exposure portion of the ground pattern is formed on the base cover so that static electricity applied to the base cover is grounded.

4 Claims, 8 Drawing Sheets

OPTICAL DISC DRIVE

CROSS-REFERENCE TO RELATED APPLICATIONS

This application claims the benefit of Korean Patent Application No. 2002-76999, filed on Dec. 5, 2002, in the Korean Intellectual Property Office, the disclosure of which is incorporated herein by reference.

BACKGROUND OF THE INVENTION

1. Field of the Invention

The present invention relates to an optical disc drive, and more particularly, to an optical disc drive which can prevent a system shut down due to external static electricity.

2. Description of the Related Art

In general, optical disc drives record information by emitting light onto a recording medium (i.e., CDs or DVDs) or reproduce the recorded information, FIGS. 1 and 2 are a plan view and a bottom view of a conventional optical disc drive, respectively. FIG. 3 shows the conventional optical disc drive where a base cover is separated.

Referring to FIGS. 1–3, the conventional optical disc drive comprises a case 10 having a circuit board 12 and a tray 16 having an optical disc D mounted thereon and installed capable of sliding in and out of the case 10.

The optical disc drive further comprises, a main base 30 coupled to the tray 16, the main base having a spindle motor 18 to rotate the optical disc D and an optical pickup 20 to record data on the optical disc D or reproduce the recorded data while sliding across the optical disc D and a bracket 40 to support the spindle motor 18. A variety of circuit patterns (not shown) including a ground pattern is provided at the bracket 40. The circuit pattern is connected to the circuit board 12 provided at the case 10 through a first flexible printed circuit (FPC) 14. A driving motor 22 to drive the optical pickup 20 is installed on the main base 30. The driving motor 22 is connected to a circuit pattern provided at the bracket 21 through a second FPC 24.

A base cover 60 is installed on a bottom surface of the main base 30 to protect various components installed on the main base 30. The surface of the base cover 60 is coated with an insulation layer. A through hole 61 through which a contact portion 53 of a leaf spring for ground 50 which is described below is formed in the base cover 60.

The leaf spring for ground 50 which is bent and contacts with the base cover 60 and the bracket 40 are assembled to the base cover 60 to remove the static electricity which may be applied from the outside to the base cover 60.

FIGS. 4 and 5 are a plan view and a sectional view of the leaf spring for ground 50, respectively. Referring to FIGS. 4 and 5, the leaf spring for ground 50 includes a coupling portion 51 coupled to the base cover 60, a contact portion 53 contacting the bracket 40, and a connection portion 52 to connect the coupling portion 51 and the contact portion 53. A plurality of sharp protrusions 51a are formed on a bottom surface of the coupling portion 51.

When the leaf spring for ground 50 is assembled to the base cover 60 by using a screw 55, the sharp protrusions 51a formed on the bottom surface of the coupling portion 51 contact with a contact surface of the base cover 60, thereby generating scratches on the base cover 60. Accordingly, a coating layer formed on the surface of the base cover 60 is peeled away. Thus, the contact portion 53 of the leaf spring for ground 50 contacts the bracket 40 through the through hole 61 formed on the base cover 60.

In the above structure, the static electricity applied from the outside of the optical disc drive to the base cover 60 where the coating layer is peeled away due to the scratches passes through the leaf spring for ground 50 toward the bracket 40.

However, in the conventional optical disc drive, since the leaf spring for ground 50 is used to remove the static electricity accumulated on the base cover 60, the number of components and the number of steps required to remove the static electricity increase.

Sharp protrusions are needed on the coupling portion 51 of the leaf spring for ground 50 to generate scratches on the surface of the base cover 60. Thus, when the leaf spring for ground 50 is manufactured by using a mold in which the shape of the protrusions is blunted, the scratches may not be generated on the surface of the base cover 60.

SUMMARY OF THE INVENTION

Accordingly, it is an aspect of the present invention to provide an optical disc drive in which the number of components is reduced so that cost is reduced and a static electricity removing function is improved.

Additional aspects and/or advantages of the invention will be set forth in part in the description which follows and, in part, will be obvious from the description, or may be learned by practice of the invention.

The foregoing and/or other aspects of the present invention are achieved by providing an optical disc drive comprising a case having a circuit board to drive the optical disc drive, a tray to have an optical disc mounted thereon and installed in the case and slidable in and out of the case, a main base coupled to the tray, the main base comprising a spindle motor to rotate the optical disc, a bracket to support the spindle motor, an optical pickup to access the optical disc, and a driving motor to drive the optical pickup, a flexible printed circuit electrically connecting the circuit board and the tray, on which a ground pattern is formed, and a base cover coupled to the main base to protect the main base, wherein an exposure portion of the ground pattern is formed on part of the flexible printed circuit, and a contact portion electrically contacting the exposure portion of the ground pattern is formed on the base cover so that static electricity applied to the base cover is grounded.

The flexible printed circuit comprises a first flexible printed circuit electrically connecting the circuit board and the main base and a second flexible printed circuit electrically connecting the main base and the tray, and the exposure portion of the ground pattern is formed on an end portion of the second flexible printed circuit.

The contact portion is formed by cutting part of the base cover and bending the cut part toward the exposure portion of the ground pattern.

BRIEF DESCRIPTION OF THE DRAWINGS

These above and/or other aspects and advantages of the invention will become more apparent and more readily appreciated from the following description of the embodiments with taken in conjunction with the accompanying drawings of which.

DETAILED DESCRIPTION OF THE PREFERRED EMBODIMENTS

Figure 1:
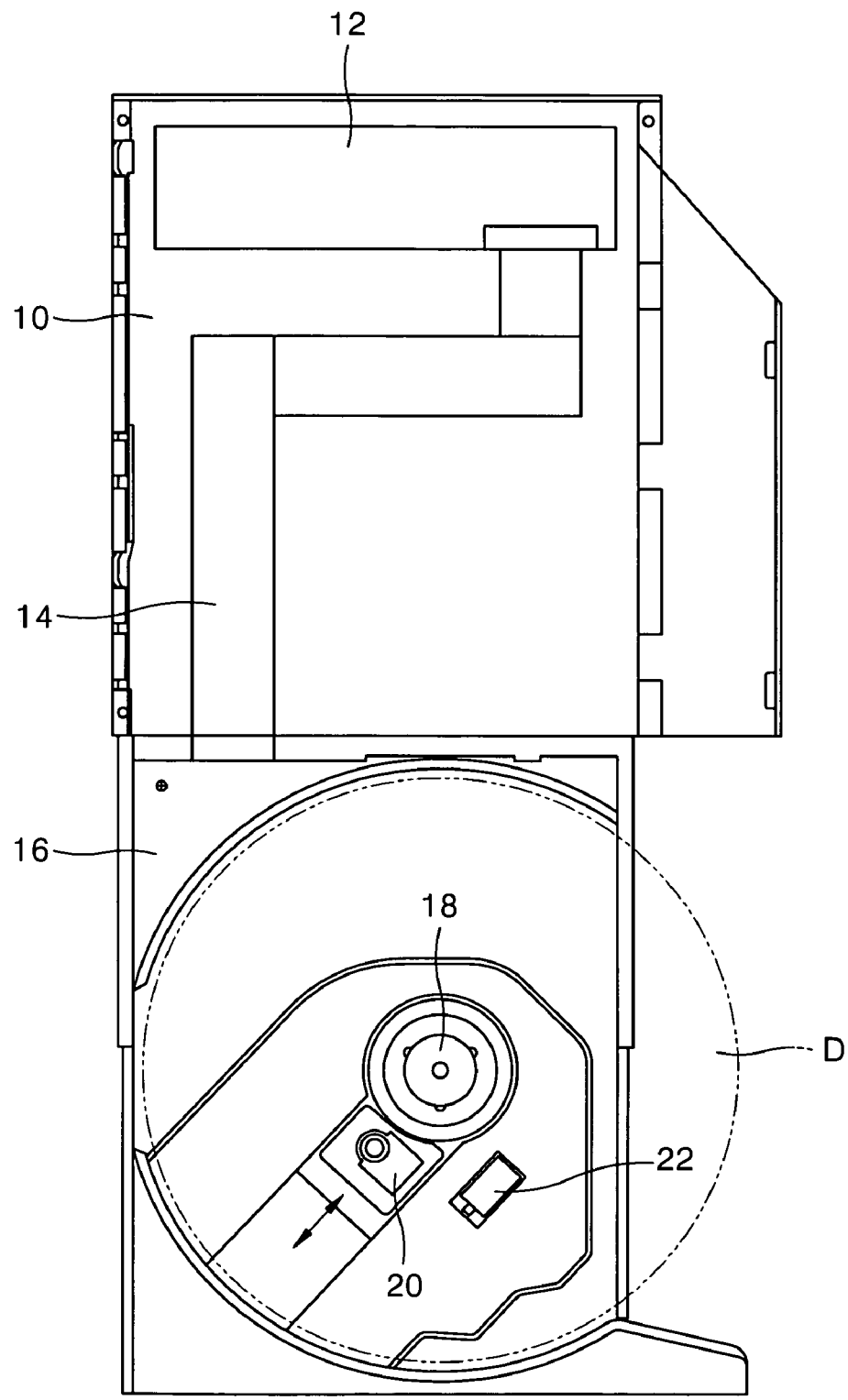
FIG. 1 is a plan view illustrating a conventional optical disc drive.
Figure 2:
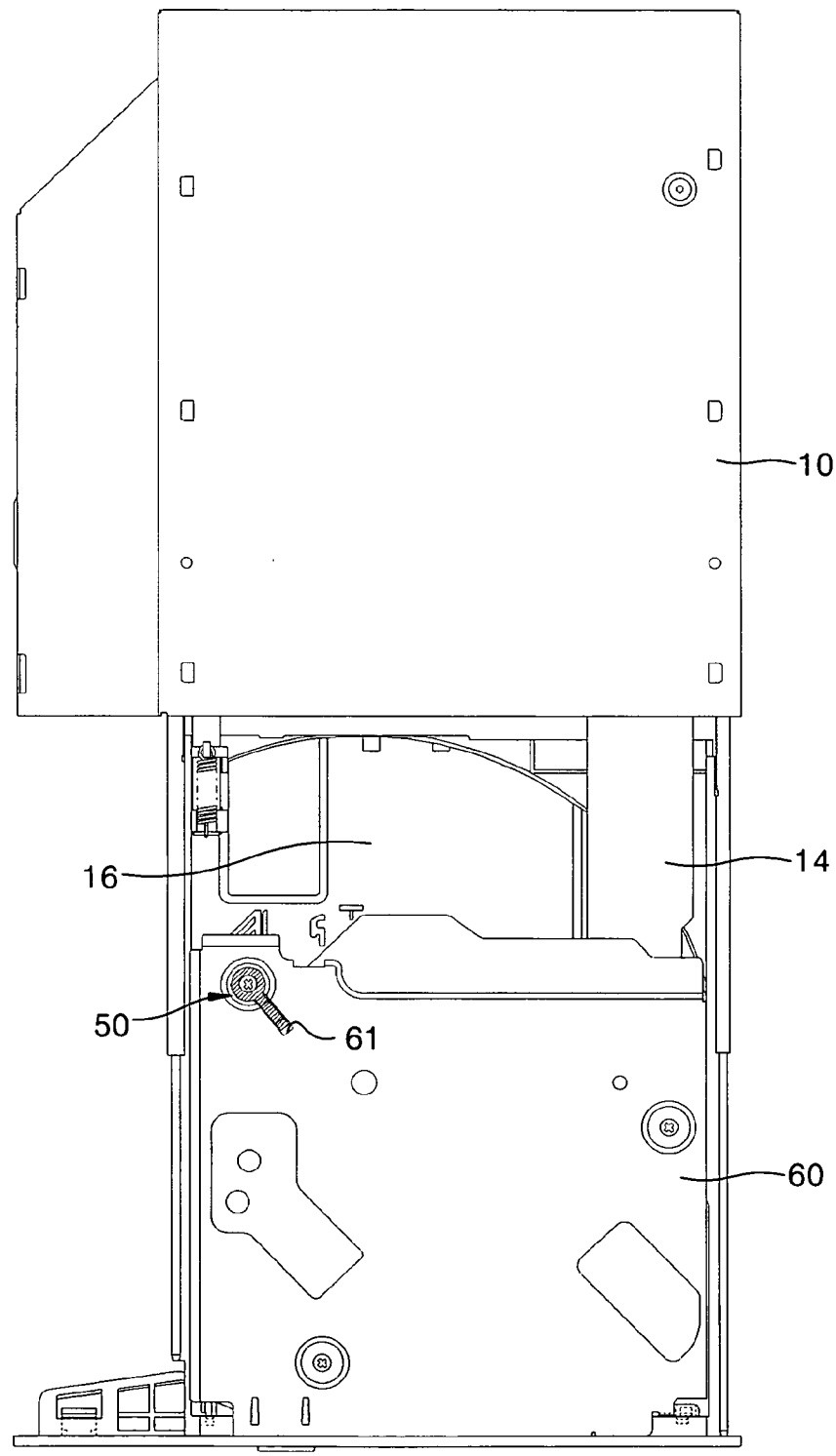
FIG. 2 is a bottom view of the optical disc drive of FIG. 1.
Figure 3:
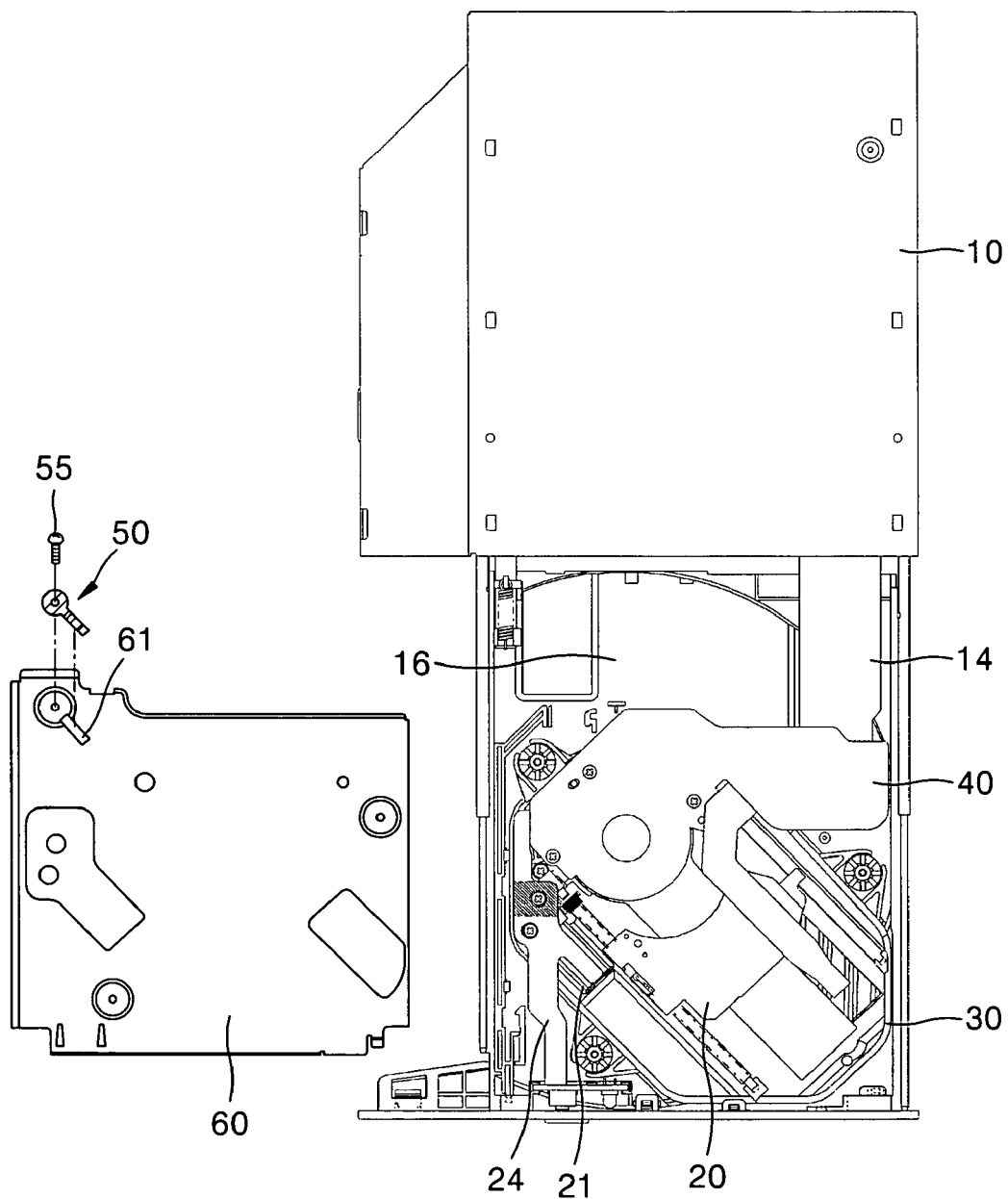
FIG. 3 is a view illustrating a state in which a base cover is separated from the optical disc drive of FIG. 2.
Figure 4:
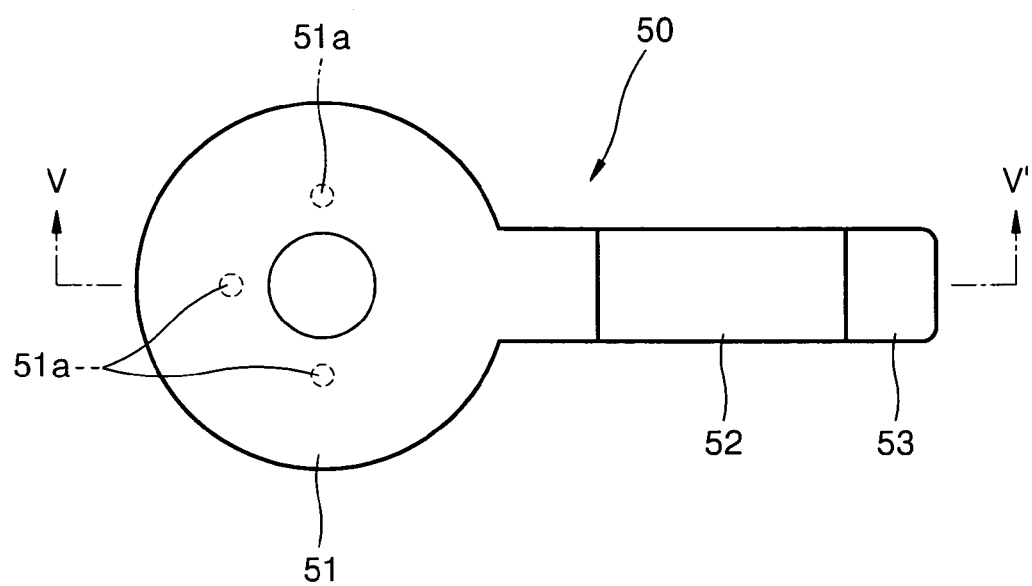
FIG. 4 is a plan view illustrating a leaf spring for ground shown in FIG. 3.
Figure 5:
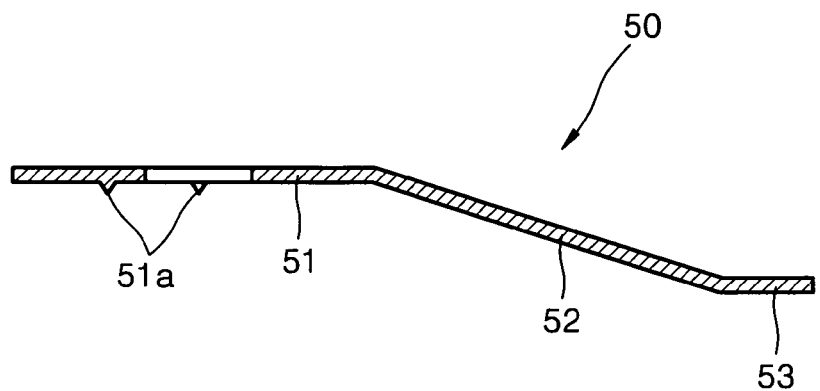
FIG. 5 is a sectional view taken along line V–V' of FIG. 4.
Figure 6:
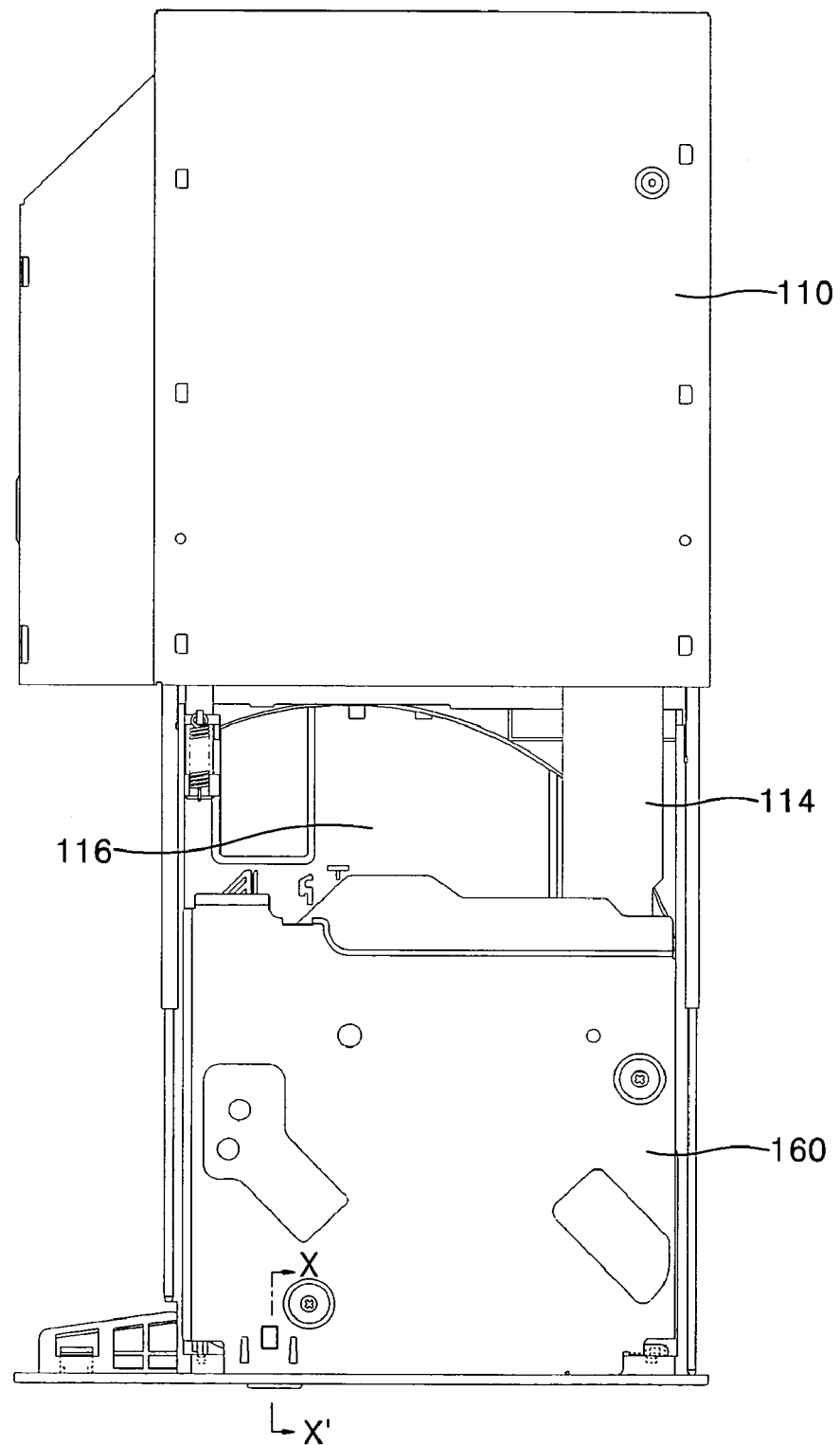
FIG. 6 is a bottom view illustrating an optical disc drive according to an embodiment of the present invention.
Figure 7:
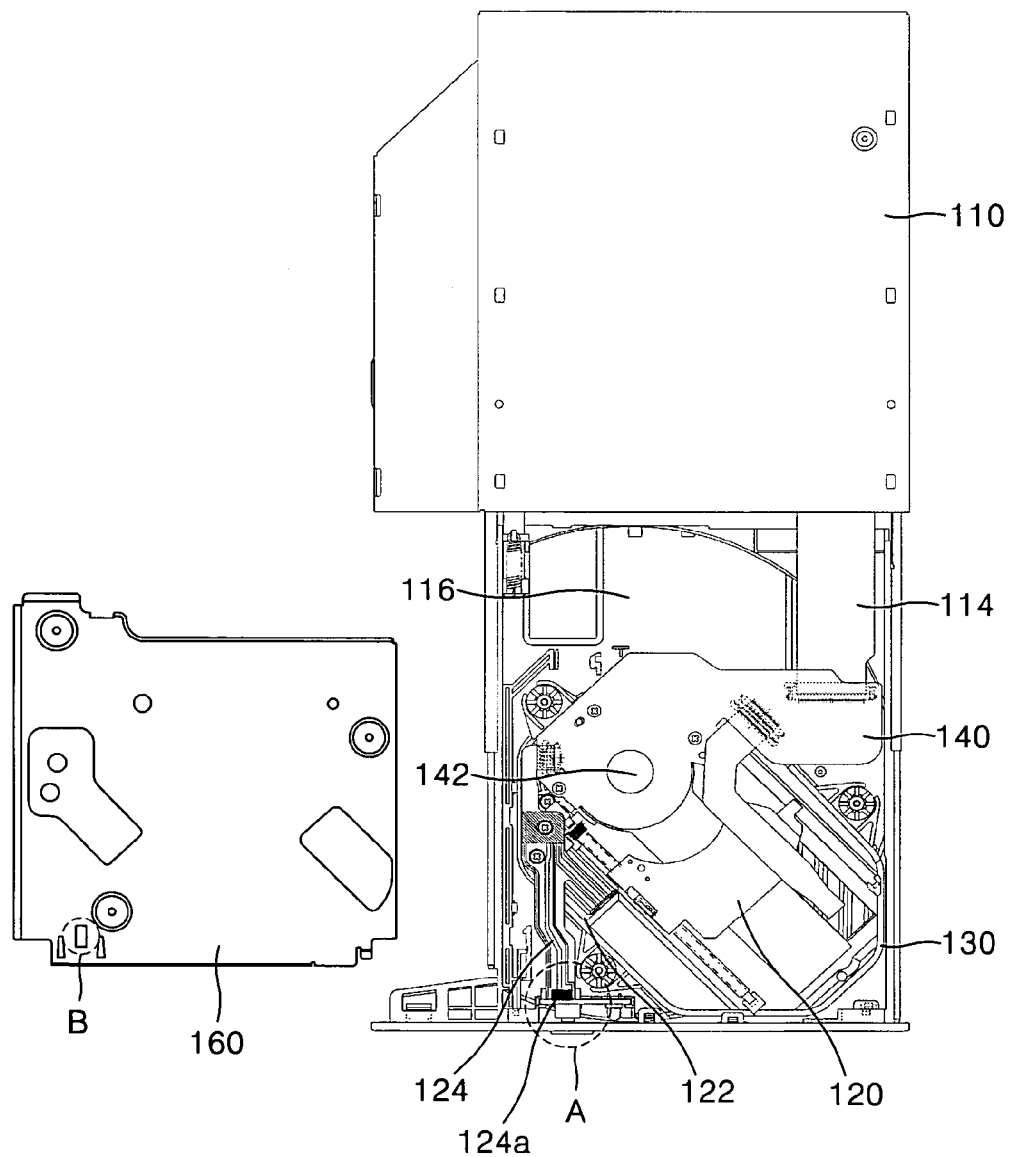
FIG. 7 is a view illustrating a state in which a base cover is separated from the optical disc drive of FIG. 6.

Reference will now be made in detail to the embodiments of the present invention, examples of which are illustrated in the accompanying drawings, wherein like reference numerals refer to the like elements throughout. The embodiments are described below to explain the present invention by referring to the figures.

Referring to FIGS. 6–10, an optical disc drive according to an embodiment of the present invention comprises a case 110 having a circuit board to drive the optical disc drive D, a tray 116 to have an optical disc D mounted thereon and installed in the case and slidable in and out of the case 110, a main base 130 coupled to the tray 116 the main base 130 comprising a spindle motor 142 to rotate the optical disc drive D, a bracket 140 to support the spindle motor 142, an optical pickup 120 to access the optical disc D, and a driving motor 122 to drive the optical pickup 120. The spindle motor 142 rotates the optical disc D and is supported by a bracket 140 where various circuit boards are provided. The optical pickup 120 driven by the driving motor 122 records data on the optical disc D or reproduces the recorded data while sliding across the optical disc D.

The optical disc drive further comprises a flexible printed circuit (FPC) electrically connecting the case 110 and the tray 116 wherein the FPC, comprises a first FPC 114 and a second FPC 124. The first FPC electrically connects a circuit board provided on the case 110 and the bracket 140 installed on the main base 130. The second FPC 124 electrically connects the bracket 140 and the tray 116.

Figure 8:
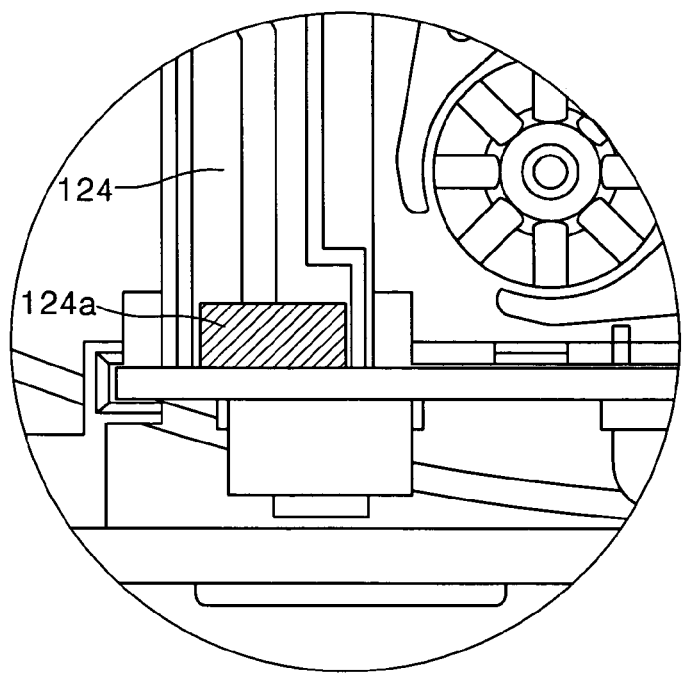
FIG. 8 is an enlarged view of a portion A of FIG. 7.

A ground pattern to ground static electricity is formed on the second FPC and part of the ground pattern is exposed outwardly. As shown in FIG. 8, an exposure portion 124a of the ground pattern is formed at an end portion of the second FPC 124.

A base cover 160 to protect various parts installed on the main base 130 is coupled to the main base 130. The surface of the base cover 160 is coated with an insulation layer.

Figure 9:
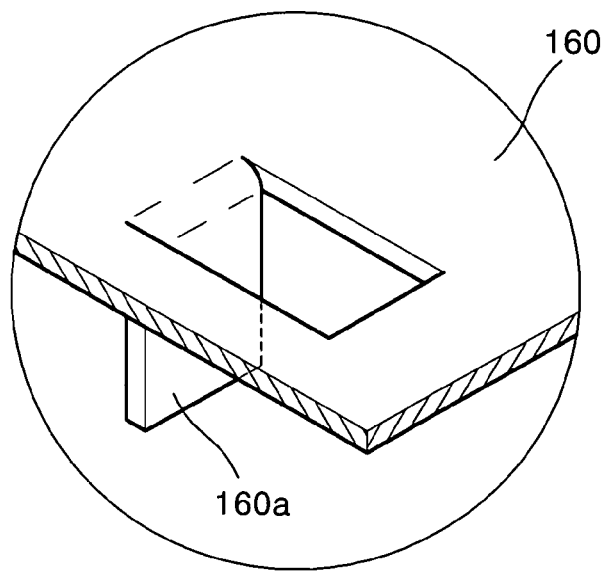
FIG. 9 is an enlarged perspective view of a portion B of FIG. 7.
Figure 10:
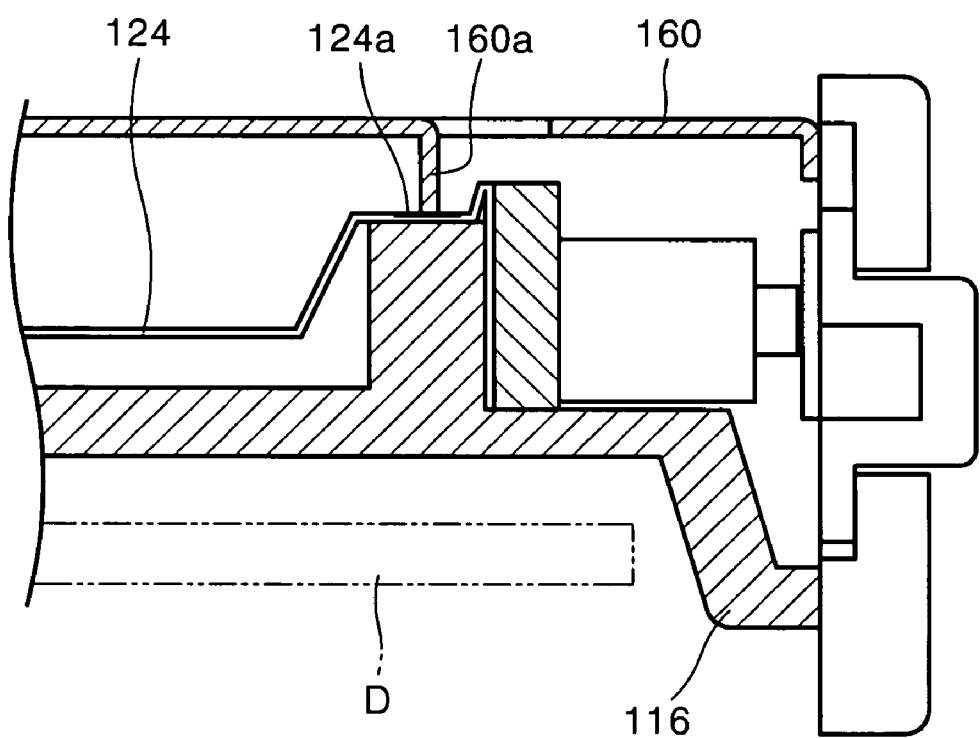
FIG. 10 is a sectional view taken along line X–X' of FIG. 6.

Also, as shown in FIG. 9, a contact portion 160a is formed on the main base 130 by cutting part of the main base 130 to be bent toward the exposure portion 124a of the ground pattern. The contact portion 160a having the above structure, contacts the exposure portion 124a of the ground pattern formed on the second FPC 124, as shown in FIG. 10. Since a cut surface of the contact portion 160a contacting the exposure portion 124a of the ground pattern is not coated with an insulation layer, electricity flows from the contact portion 160a to the exposure portion 124a of the ground pattern.

In the above structure, when external static electricity is applied to the base cover 160, the static electricity flows toward the exposure portion 124a of the ground pattern through the contact portion 160a of the base cover 160 and is then grounded.

As described above, the optical disc drive according to the present invention has the following merits.

Since the conventional leaf spring for ground is not needed, the number of components and the number of steps can be reduced and a cost of materials can be reduced. Also, a problem that a static electricity removing function is deteriorated due to a change in a mold for manufacturing of the leaf spring for ground can be solved.

Although a few embodiments of the present invention have been shown and described, it would be appreciated by those skilled in the art that changes may be made in this embodiment without departing from the principles and spirit of the invention scope of which is defined claims.

What is claimed is:

1. An optical disc drive comprising:
   a case having a circuit board;
   a tray to have an optical disc mounted thereon, and installed in the case and slidable in and out of the case;
   a main base coupled to the tray, the main base comprising
      a spindle motor to rotate the optical disc, a bracket to support the spindle motor, an optical pickup to access the optical disc and a driving motor to drive the optical pickup;
   a flexible printed circuit comprising:
      a first flexible printed circuit electrically connecting the circuit board and the main base, and
      a second flexible printed circuit electrically connecting the main base and the tray,
   wherein a ground pattern is formed on the second flexible printed circuit to ground static electricity; and
   a base cover coupled to the main base to protect the main base,
   wherein an exposure portion of the ground pattern is formed on an end portion of the second flexible printed circuit, and a contact portion electrically contacting the exposure portion of the ground pattern is formed on the base cover so that static electricity applied to the base cover is grounded.

2. The optical disc drive of claim 1, wherein the contact portion is formed on the main base by cutting a part of the base cover and bending the cut part toward the exposure portion of the ground pattern.

3. The optical disc drive of claim 1, wherein the base cover is coated with an insulation layer.

4. An optical disc drive comprising:
   a case having a circuit board;
   a tray to have an optical disc mounted thereon, and installed in the case and slidable in and out of the case;
   a main base coupled to the tray, the main base comprising
      a spindle motor to rotate the optical disc, a bracket to support the spindle motor, an optical pickup to record data on the optical disc and reproduce data while sliding across the optical disc and a driving motor to drive the optical pickup;
   a flexible printed circuit comprising a first flexible printed circuit electrically connecting the circuit board and the main base, and a second flexible printed circuit elec trically connecting the main base to the tray, wherein a ground pattern is formed on the second flexible printed circuit and an exposure portion of the ground pattern is formed at an end portion of the second flexible printed circuit and is exposed outwardly to ground static electricity; and a base cover coupled to the main base and coated with an insulation layer to protect the main base, wherein a contact portion of the base cover is bent toward the exposure portion of the ground pattern and a cut surface of the contact portion is not coated with the insulation layer to allow electricity to flow from the contact portion to the exposure portion of the ground pattern.

* * * * *